United States Patent [19]

Giannelis et al.

[11] Patent Number: 5,032,546

[45] Date of Patent: Jul. 16, 1991

[54] ION EXCHANGED ORGANIC-INORGANIC COMPOSITES

[75] Inventors: Emmanuel P. Giannelis; Vivek Mehrota, both of Ithaca, N.Y.

[73] Assignee: Cornell Research Foundation, Inc., Ithaca, N.Y.

[21] Appl. No.: 486,457

[22] Filed: Feb. 28, 1990

[51] Int. Cl.$^5$ .............................................. C03C 10/16
[52] U.S. Cl. .......................................... 501/3; 501/4; 501/32
[58] Field of Search .................................. 501/3, 4, 32

[56] References Cited

U.S. PATENT DOCUMENTS

| | | | |
|---|---|---|---|
| 4,239,519 | 12/1980 | Beall et al. | 501/4 |
| 4,339,540 | 7/1982 | Beall et al. | 501/3 |
| 4,454,237 | 6/1984 | Hoda et al. | 501/4 |
| 4,455,382 | 6/1984 | Wu | 501/4 |

Primary Examiner—Mark L. Bell
Assistant Examiner—Deborah Jones
Attorney, Agent, or Firm—Jones, Tullar & Cooper

[57] ABSTRACT

This invention is directed to the production of organic-inorganic composite bodies demonstrating electrical insulating characteristics consisting essentially of lithium and/or sodium water-swelling crystals selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, wherein the $Li^{30}$ and/or $Na^+$ ions from the interlayer of said lithium and/or sodium water-swelling mica crystals have been exchanged with an organic polycation, the galleries of said crystals containing an organic polymer exhibiting very low permittivity resulting from the transformation of the organic polycation. The preferred organic polycation is a poly(p-xylene-α-dialkylsulfonium) halide and the preferred organic polymer exhibiting very low permittivity is poly(p-phenylene vinylene).

8 Claims, No Drawings

ION EXCHANGED ORGANIC-INORGANIC COMPOSITES

This invention was made in part under National Science Foundation Grant No. DMR-8818558. The United States Government has certain rights to this invention.

RELATED APPLICATION

Application Ser. No. 07/486,335, filed concurrently herewith by the present applicants under the title ORGANICINORGANIC COMPOSITES, describes the preparation of composite bodies demonstrating electrical insulating characteristics consisting essentially of a transition metal-exchanged lithium and/or sodium water-swelling mica wherein the galleries thereof contain an organic polymer exhibiting very low permittivity.

BACKGROUND OF THE INVENTION

The evolving demands for electronic packaging of very large scale integrated circuits require increasingly severe specifications of high integration, speed, and reliability. Accordingly, new materials with low dielectric constants, coefficients of thermal expansion compatible with the semiconductor component, and high thermal conductivity have been sought in order to accommodate to the increasing switching speeds of transistors. By lowering the dielectric constant of the substrate material, the thickness of the insulating layers can be reduced without loss of impedance.

One approach taken by the art to develop such new materials has involved the use of low dielectric organic polymers such as polyimide for the insulating layers. Polyimide exhibits a high glass transition temperature with relatively good thermal stability and mechanical properties. A serious drawback of polyimide, however, resides in its coefficient of thermal expansion being an order of magnitude higher than that of the semiconductor material. Additionally, organic polymers generally lack the thermal and mechanical stability, particularly in radiation environments, intrinsic to ceramic materials. For example, efforts to replace polyimide with various fluoropolymers have not met with much success. Despite their low permittivity, their strength and modulus are prohibitively low, thereby resulting in creep under load and when subjected to environmental thermal cycling.

Recent research has been directed to the fabrication of composite bodies consisting of a combination of a ceramic material and an organic phase. The objective of such research has been to produce articles wherein the desirable properties of the organic phase would be joined with the desired properties of the ceramic material. Illustrations of that research are disclosed in U.S. Pat. No. 4,239,519 (Beall et al.), U.S. Pat. No. 4,454,237 (Hoda et al.) and U.S. Pat. No. 4,455,382 (Wu).

U.S. Pat. No. 4,239,519 describes the preparation of organic-inorganic composite bodies containing crystals of a cation exchanged lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite. In the preferred inventive embodiment the starting water-swelling mica was prepared by forming a glass-ceramic body through the heat treatment of a precursor glass body; that glass body generally consisting essentially, in weight percent, of 0–12% $Li_2O$, 0–10% $Na_2O$, 0.5–14% $Li_2O+Na_2O$, 0–30% $B_2O_3$, 10–38% MgO, 0–10% $Al_2O_3$, 35–70% $SiO_2$, 0–15% F, 0–15% OH, 4–15% F+OH, and, optionally, up to 30% total of oxides in the indicated proportions selected from the group of 0–10% CaO, 0–10% CdO, 0–10% CoO, 0–10% CuO, 0–20% FeO, 0–20% $Fe_2O_3$, 0–10% MnO, 0–10% NiO, 0–10% $P_2O_5$, 0–30% PbO, 0–20% SrO, 0–10% $TiO_2$, 0–25% ZnO, and 0–10% ZrO. The preferred base compositions consisted essentially of 0.5–12% $Li_2O$, 0–10% $Na_2O$, 0.5–14% $Li_2O+Na_2O$, 14–38% MgO, 0–15% $B_2O_3$, 0–10% $Al_2O_3$, 35–70% $SiO_2$, and 5–15% F. The glass-ceramic bodies prepared from the above composition intervals contained crystals selected from the group of fluorhectorite, boron fluorphlogopite, and solid solutions between those and between those and other structurally-compatible species selected from the group of talc, fluortalc, polylithionite, fluorpolylithionite, phlogopite, and fluorphlogopite. The above-described glass-ceramic body was contacted with a polar liquid, desirably water, to cause swelling and disintegration of the body accompanied with the formation of a gel. The solid-liquid ratio of the gel was adjusted to a desired fluidity depending upon the geometry of the ultimate article to be formed. The desired article was formed and then contacted with a source of large cations (most frequently a water solution thereof) to effect an ion exchange reaction between those cations and the $Li^+$ and/or $Na^+$ ions from the interlayer of the mica crystals with accompanying flocculation of the gel. Finally, the ion exchanged article was dried. The preferred large cations were selected from the group of $Ag^+$, $Ba^{+2}$, $Ca^{+2}$, $Cu^{+2}$, $Cs^+$, $K^+$, $NH_4^+$, $Pb^+$, $Rb^+$, $Sr^{+2}$, and certain organic polycations, specifically noting aniline hydrochloride and quaternary ammonium compounds. Hence, with the organic polycations as the substituting cations, the $Li^+$ and/or $Na^+$ ions present in the interlayer of the mica crystals are replaced with the organic polycations.

As is explained in U.S. Pat. No. 4,239,519, the crystals developed exhibit a morphology of a continuum of flakes, rectangular-like strips, and interwoven ribbons in parallel or sub-parallel zones or sheaths, with said flakes being irregularly shaped with diameters between about 0.5–10 microns and cross sections of less than 100Å, and said strips and ribbons being about 0.5–10 microns long, about 500–5000Å wide, and less than about 100Å thick. That morphology results in crystals demonstrating very high aspect ratios, higher than naturally-occurring micas, and large surface areas, both of those features serving to recommend their utility for reinforcing various matrices.

U.S. Pat. No. 4,454,237 discloses the preparation of an organic-inorganic composite body demonstrating hydrophobic behavior. The lithium and/or sodium water-swelling micas described in U.S. Pat. No. 4,239,519 comprised the starting materials, and the process utilized in preparing the body also followed that reported in that patent. The ion exchange reaction involved organic polycations selected from the group of aminosilanes and organic chrome complexes. As was observed in Hoda et al., the amount of aminosilane and/or organic chrome complex sufficient to replace essentially all of the $Li^+$ and/or $Na^+$ ions in the interlayer of the mica will be employed.

U.S. Pat. No. 4,455,382 likewise discloses the preparation of an organic-inorganic composite body wherein the lithium and/or sodium water-swelling micas recorded in U.S. Pat. No. 4,239,519 comprise the starting materials and the process employed in preparing the body also followed that described in that patent. The ion exchange reaction involved organic polycations selected from the group of (a) a primary amine solubilized with acid, (b) a secondary amine solubilized with acid, (c) a tertiary amine solubilized with acid, (d) a quaternary ammonium acid salt, (e) a quaternary phosphonium acid salt, and (f) a ternary sulfonium acid salt. Again, an amount sufficient to replace essentially all of the Li+ and/or Na+ ions in the interlayer of the mica will be utilized.

SUMMARY OF THE INVENTION

The primary objective of our invention was to develop organic-inorganic composites demonstrating good insulating properties through the inclusion of an organic polymer exhibiting very low permittivity. Inasmuch as the series mode is the most efficient in reducing the permittivity of a body, our research was focused on ceramic layered host bodies that can be processed to form multilayered structures with molecular periodicity. Accordingly, our invention was directed to the production of ceramic-based composites wherein the second phase is a low permittivity organic polymer. The ceramic/polymer composites combine the excellent properties of ceramics in terms of mechanical strength, coefficient of thermal expansion, and thermal stability, with the low dielectric characteristics and good processability of the organic polymer. Accordingly, in ceramic matrices highly filled with organic polymer, one can exploit the synergistic interactions between the ceramic and the polymer.

Fluorhectorite is a synthetic mica-type silicate with a layered lattice structure in which two-dimensional, multiple cross-linked planes of atoms are separated by layers of hydrated cations. The stacking of the layers to form crystals leads to the formation of interlayers or "galleries" in which the layers are held together by electrostatic or van der Waals forces. In fluorhectorite and other charged silicates, the galleries are occupied by hydrated cations which act to balance the charge deficiency that has been generated by the isomorphous substitution in the tetrahedral or octahedral sheets. The strong intraplanar, but weak interplanar, binding forces that arise from the two-dimensional structure allow the introduction (intercalation) of guest species into the galleries of the host crystal lattice.

Simple intercalative and/or ion exchange procedures permit a variety of organic species of virtually any size to be accommodated within the galleries of layered, synthetic mica-type silicates such as lithium fluorhectorite. Spectroscopic characterization of the intercalates has indicated that the properties of the gallery species are generally preserved on intercalation. Measurements have indicated that the average area per unit layer charge is approximately 28Å$^2$ for synthetic-mica-type silicates, such that intercalating species with cross-sectional areas less than that value cannot fully cover the gallery surfaces, thereby resulting in a nanoporous structure.

This invention is founded in the exchange of a particular organic polycation with Li+ and/or Na+ ions from the interlayer of the layered, synthetic mica-type silicates of the identities disclosed in U.S. Pat. No. 4,239,519, with in situ intercalation of the polycation into the galleries of the mica-type silicates to yield bodies comprising a pseudo two-dimensional composite with nanometer architecture.

In carrying out the inventive process, a suspension of a layered, synthetic mica-type silicate of the kind described in U.S. Pat. No. 4,239,519 is added to a solution of a halide-containing, sulfonium polymer precursor, resulting in immediately flocculation indicative of polymer intercalation. That reaction can be illustrated in the following equation wherein the horizontal lines identify the layered structure, P+ represents the soluble polymer precursor, and X− designates the halide.

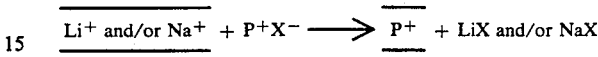

$$\underline{Li^+\ and/or\ Na^+} + P^+X^- \longrightarrow \underline{P^+} + LiX\ and/or\ NaX$$

Intercalation of the macromolecular chains was confirmed through examination of X-ray diffraction data.

In the preferred embodiment, a poly(p-xylene-α-dialkylsulfonium) halide comprised the precursor organic polycation and that compound was converted to poly(p-phenylene vinylene), a material exhibiting very low permittivity, through heating to effect the elimination of dialkyl sulfide and hydrogen halide In the most preferred embodiment, poly(p-xylene-α-dimethylsulfonium) chloride constitutes the precursor organic polycation and lithium fluorhectorite the water-swelling mica.

DESCRIPTION OF PREFERRED EMBODIMENTS

A glass-ceramic containing synthetic lithium fluorhectorite was prepared by heat treating a precursor glass consisting essentially, in parts by weight, of 6.2 Li$_2$O, 24 MgO, 60 SiO$_2$, and 10 F. (Because it is not known in what proportions fluoride is combined with the Li+ and Mg+$^2$ ions, it is simply reported in terms of fluoride. Also, inasmuch as the sum of the four ingredients closely approximates 100, for all practical purposes the values can be deemed to represent weight percent.) The precursor glass body was heat treated at about 700° C. for about four hours to yield a highly crystalline, glass-ceramic body containing lithium fluorhectorite as the predominant crystal phase. The glass-ceramic body was comminuted and the resultant particles immersed into deionized water, whereupon it disintegrated and formed a gel. After occasional stirring, the material was allowed to settle and the gel decanted, leaving any residual glass and non-micaceous phases, if present.

The gel (suspension) was contacted with poly(p-xylene-α-dialkylsulfonium) chloride which, being soluble in water, permitted the direct exchange of the polycation with the interlayer Li+ ions of the fluorhectorite. Immediate flocculation took place. After washing the flocs several times with deionized water to remove LiCl and excess polycation, a suspension of the flocs in deionized water was prepared.

Thin films of the exchanged fluorhectorite were prepared by evaporating a suspension thereof on either a polyethylene plate (for self-supporting films) or on a glass substrate. Intercalation of the polycation was determined from X-ray diffraction data showing that the d-spacing expands from 12.6Å to 20.6Å and a gallery height of 11Å. Electronic absorption spectra exhibit a complex absorption pattern with a broad feature centered at 328 nm (3.8 eV), thereby in agreement with the spectrum of the unintercalated polymer.

The films were heated to 350° C. to convert the polycation to poly(p-phenylene vinylene). The d-spacing is reduced to 16.5Å, thereby indicating the elimination of dimethyl sulfide and the accompanying transformation to poly(p-phenylene vinylene). In accordance with the transformation to poly(p-phenylene vinylene), the electronic absorption spectrum after curing demonstrates a broad peak at around 400 nm. The absorption spectrum is sensitive to the conjugation (transformation) which, in turn, is sensitive to the conditions of curing.

The relative permittivity for poly(p-phenylene vinylene) intercalated lithium fluorhectorite ranged from a dielectric constant (25° C.) of about 5.2 at 100 Hz to about 2.6 at $10^7$ Hz The loss tangent was about 0.07. Those measurements were conducted under ambient laboratory conditions with no specific attempt being made to exclude humidity. The dielectric properties remained substantially constant after exposures of the films to the ambient environment for in excess of one month.

We claim:

1. An electrically insulating organicinorganic composite body consisting essentially of lithium and/or sodium water-swelling mica crystals selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, wherein the $Li^+$ and/or $Na^+$ ions from the interlayer of said lithium and/or sodium water-swelling mica crystals have been exchanged with an organic polycation, the galleries of said crystals containing a very low permittivity organic polymer resulting from the transformation of said organic polycation.

2. A composite body according to claim 1 wherein said lithium and/or sodium water-swelling mica consists essentially, in weight percent, of

| | | | |
|---|---|---|---|
| $Li_2O$ | 0–12 | $Al_2O_3$ | 0–10 |
| $Na_2O$ | 0–10 | $SiO_2$ | 35–70 |
| $Li_2O + Na_2O$ | 0.5–14 | F | 0–15 |
| MgO | 10–38 | OH | 0–15 |
| $B_2O_3$ | 0–30 | F + OH | 4–15. |

3. A composite body according to claim 2 wherein said lithium and/or sodium water-swelling mica consists essentially, in weight percent, of

| | | | |
|---|---|---|---|
| $Li_2O$ | 0.5–12 | $B_2O_3$ | 0–15 |
| $Na_2O$ | 0–10 | $Al_2O_3$ | 0–10 |
| $Li_2O + Na_2O$ | 0.5–14 | $SiO_2$ | 35–70 |
| MgO | 14–38 | F | 5–15. |

4. A composite body according to claim 3 wherein said water-swelling mica is a lithium fluorhectorite.

5. A composite body according to claim 1 wherein said organic polycation consists of a poly(p-xylene-α-dialkylsulfonium) halide.

6. A composite body according to claim 5 wherein said organic polycation consists of poly(p-xylene-α-dimethylsulfonium) chloride.

7. A composite body according to claim 5 wherein said organic polymer exhibiting very low permittivity consists of poly(p-phenylene vinylene).

8. A composite body according to claim 1 wherein the galleries of said crystals have an average area per unit layer charge of approximately 28Å$^2$ and the surfaces thereof are covered with said organic polymer.

* * * * *